United States Patent [19]
Simms et al.

[11] Patent Number: 6,101,575
[45] Date of Patent: Aug. 8, 2000

[54] TAPE DRIVE DATA BUFFERING

[75] Inventors: Mark J. Simms, Boise; R. Alexis Takasugi, Eagle, both of Id.

[73] Assignee: Hewlett-Packard Company, Palo Alto, Calif.

[21] Appl. No.: 09/175,806

[22] Filed: Oct. 20, 1998

[51] Int. Cl.[7] .................................................. G06F 12/08
[52] U.S. Cl. ............................ 711/117; 711/4; 711/111; 710/30; 710/32; 710/34; 710/48; 710/52; 710/57; 710/59; 710/60
[58] Field of Search ............................. 711/4, 117, 111; 710/30, 32, 34, 48, 52, 57, 59, 60

[56] References Cited

U.S. PATENT DOCUMENTS

| | | | |
|---|---|---|---|
| 5,125,096 | 6/1992 | Brantley, Jr. et al. | 709/235 |
| 5,309,451 | 5/1994 | Noya et al. | 714/766 |
| 5,327,535 | 7/1994 | Ogata et al. | 711/113 |
| 5,448,420 | 9/1995 | Henits et al. | 360/48 |
| 5,450,546 | 9/1995 | Krakirian | 710/57 |
| 5,546,533 | 8/1996 | Koyama | 714/5 |
| 5,771,356 | 6/1998 | Leger et al. | 709/233 |
| 5,822,618 | 10/1998 | Ecclesine | 710/57 |
| 5,884,099 | 3/1999 | Klingelhofer | 710/52 |
| 5,892,979 | 4/1999 | Shiraki et al. | 710/52 |

FOREIGN PATENT DOCUMENTS

| | | |
|---|---|---|
| 0784261A | 7/1997 | European Pat. Off. . |
| WO9838580A | 9/1998 | WIPO . |

*Primary Examiner*—Hiep T. Nguyen

[57] ABSTRACT

A tape storage device is used in conjunction with a host computer to archive data. The storage device has interface logic that buffers blocks of data from the host computer in a memory buffer. The interface logic processes data as the data is received to create a processed data block that is smaller in size than the original, unprocessed data block. While receiving elements of the data block, the interface logic repeatedly determines the amount of free memory in the memory buffer, and temporarily suspends the block transfer whenever the amount of free memory falls below a predetermined threshold. The block transfer is resumed when the amount of free memory becomes equal to or greater than the threshold. This utilizes nearly all available memory, while preventing buffer overflow, without any need to perform complex calculations to predict the size of the data block after processing.

15 Claims, 3 Drawing Sheets

TAPE DRIVE DATA BUFFERING

TECHNICAL FIELD

The invention relates to tape storage devices and to methods of processing and transferring block of data to such tape storage devices.

BACKGROUND OF THE INVENTION

It is common for a host computer to archive data on a linear tape storage device or medium. The characteristics of linear tape storage devices generally require that data be provided at a fixed rate that is related to the linear speed of the tape medium itself. In most cases, electronic interface logic is associated with a tape drive in order to accept data at a rate more convenient for the host computer, and to then format the data appropriately for the tape writing mechanisms. In addition, the interface logic processes the data in various way, such as by compressing the data.

It is conventional for the host computer to break data into relatively large data blocks, and to provide such data blocks as integral packages of data to the tape drive interface logic. This is done for the sake of efficiency. Rather than making intermittent small data transfers at a rate set by the tape device, the host computer is allowed to make larger block transfers at less frequent intervals but at higher data rates, thereby freeing the intervening time for other tasks. Block size is normally established by the host computer. The primary purpose of the interface logic is to buffer the data blocks as they are received, to process the data blocks (such as by compressing them), and to write the resulting data block elements to the tape medium at the rate required by the tape medium.

The interface logic normally includes a memory buffer for incoming data. The buffer is used to synchronize data transfers from the host computer to the tape drive. By using a buffer, the interface logic can accept blocks of data at high data rates from the host computer, and then write the data to the tape device at the slower rate required by the tape device.

Before accepting a data block from the host computer, the interface logic determines whether there is enough buffer memory to hold the data block. However, because of compression and other processing performed by the interface logic, it is often difficult to determine the amount of buffer space that will be needed for a particular data block after it has been processed. When beginning a block transfer, the host computer indicates the size of the unprocessed block. However, complex calculations might be required to determine the size of the block after processing. There are known ways to overcome this problem.

One way is to actually calculate the size of the processed data, based on the size of the incoming unprocessed data block, prior to allowing the block transfer to begin. The disadvantage of this method is that it requires complex software algorithms or expensive custom hardware to perform the calculations.

Another way is to conservatively approximate the size of the processed data, avoiding the complex calculations noted above. This method, however, tends to waste buffer memory due to the conservative nature of the approximations.

A third way is to use two memory buffers. Incoming blocks are stored, without processing, in a first buffer. Once a block is stored in the first buffer, it is processed and written to a second buffer, prior to writing to the tape itself. This method has the obvious disadvantage of requiring much more memory than the previous two methods.

SUMMARY OF THE INVENTION

In accordance with the invention, a single buffer is used by tape drive interface logic to buffer incoming data blocks. Data is processed as it is received from the host computer and is then stored in the buffer. The interface logic monitors the amount of available buffer memory (which decreases as data is received and increases as data is written to tape). When the amount of free memory drops below a predetermined threshold, the block transfer is temporarily halted. When more memory becomes available, and the amount of free memory rises above the threshold, the block transfer is resumed. The use of a non-zero threshold eliminates buffer overruns that might otherwise result from data that has been accepted from the computer, but that has not yet been buffered. The threshold is calculated to always leave room for the maximum possible amount of such "in-transit" data.

DETAILED DESCRIPTION OF THE INVENTION

Figure 1:
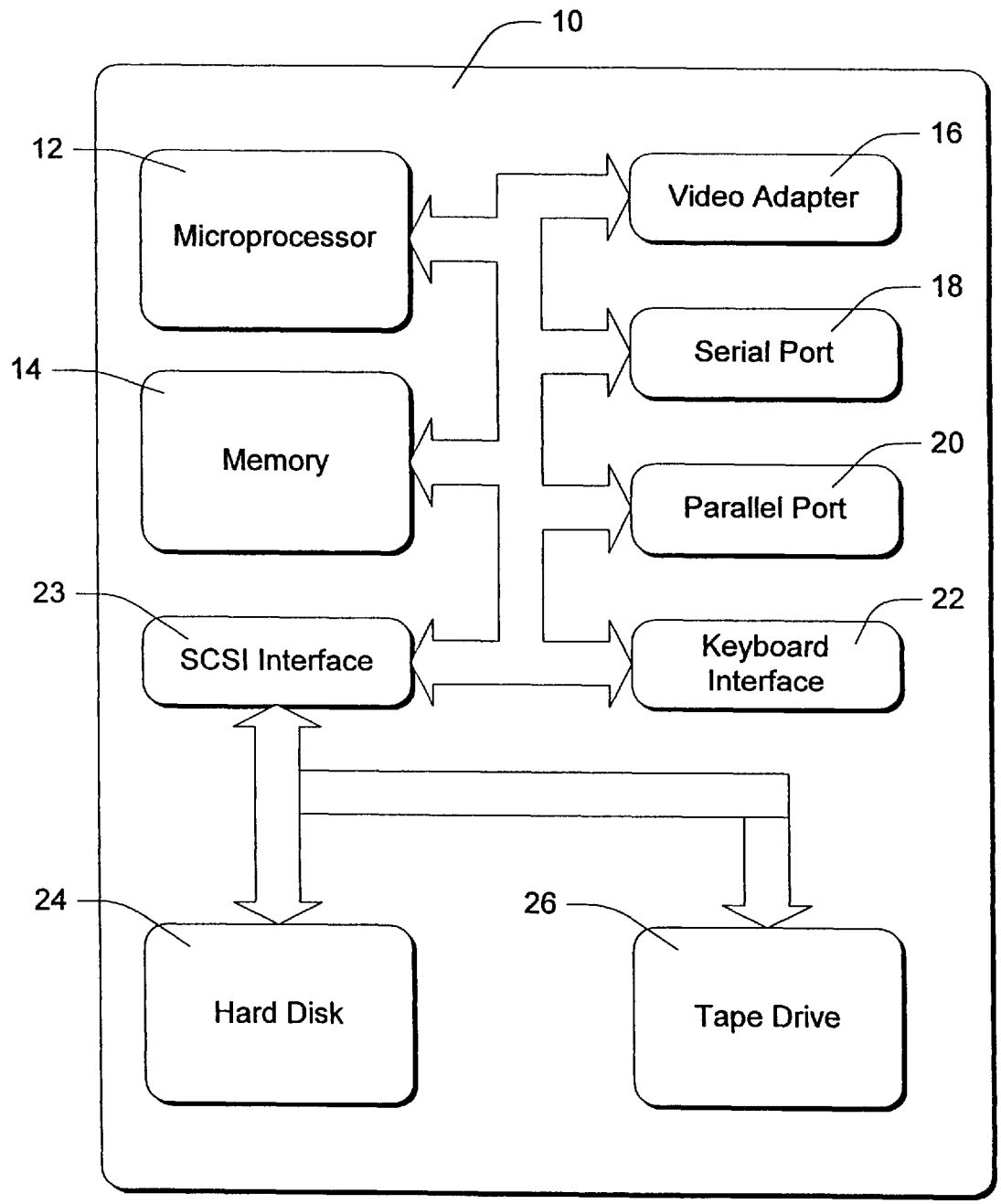
FIG. 1 is a block diagram of a computer system in accordance with the invention.

FIG. 1 shows a computer system 10 in accordance with the invention. Computer system 10 includes a microprocessor 12 and associated memory 14. It also includes various peripheral interfaces such as a video adapter 16, a serial port 18, a parallel printer port 20, a keyboard interface 22, and other interfaces not shown. The system also includes a SCSI (small computer system interface) interface 23 for connection to various different peripherals such as a hard disk 24 and a tape drive 26. The SCSI interface might also be used for connecting different devices such as CD-ROM and DVD devices. The SCSI interface is defined by a well-known standard, and is used in many desktop computers.

Figure 2:
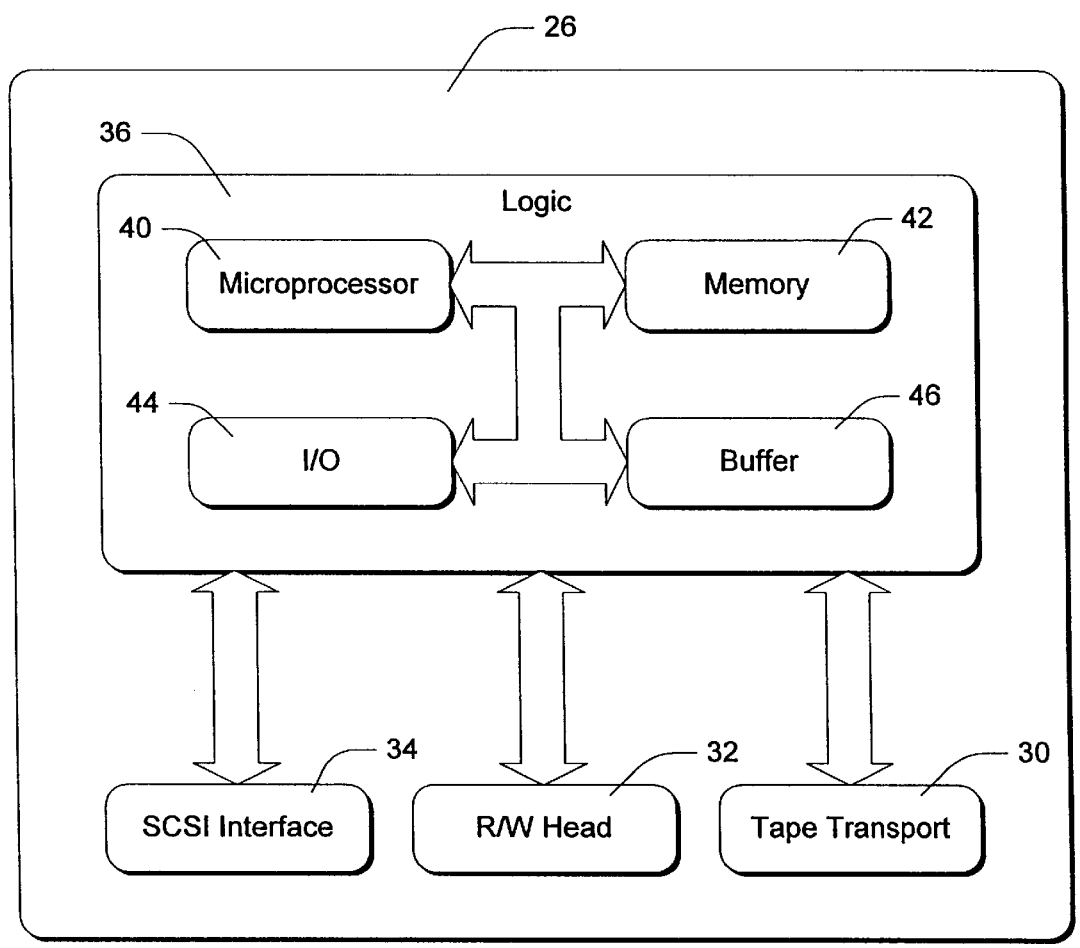
FIG. 2 is a block diagram of a tape drive system in accordance with the invention.

FIG. 2 shows pertinent components of tape drive 26 in block form, including a tape transport mechanism 30, a read/write head mechanism 32, a SCSI interface 34, and interface logic 36 that provides a logical interface between host computer 10 and the tape writing mechanisms 30 and 32 of tape drive 26. Interface logic 36 can be formed by programmable components that retrieve and process instructions from memory, or by fixed-logic components that are interconnected to provide the functionality described below. Furthermore, interface logic 36 and its functions can be implemented by a combination of different types of logical components, including components that are commonly referred to as software, hardware, and firmware.

For purposes of illustration, interface logic 36 is shown as being comprised of a programmable microprocessor or microcontroller 40 in conjunction with addressable memory components 42 and I/O circuits 44. The memory components 42 include both non-volatile memory (such as ROM or EPROM) and volatile memory (such as some type of RAM). The addressable memory components 42 store a program. The program has instructions that are retrieved and executed by microprocessor 40. The interface logic is configured to implement conventional functions, including functions for reading and writing a tape and for transferring data over SCSI interface 34.

As shown in FIG. 2, the interface logic includes a data buffer 46. Although shown separately for purposes of discussion, this data buffer might be a part of memory 42. The data buffer is used to buffer data received from host computer system 10, before the data is written to tape, and to synchronize the processes of receiving data from the host computer and writing the data to tape.

Figure 3:
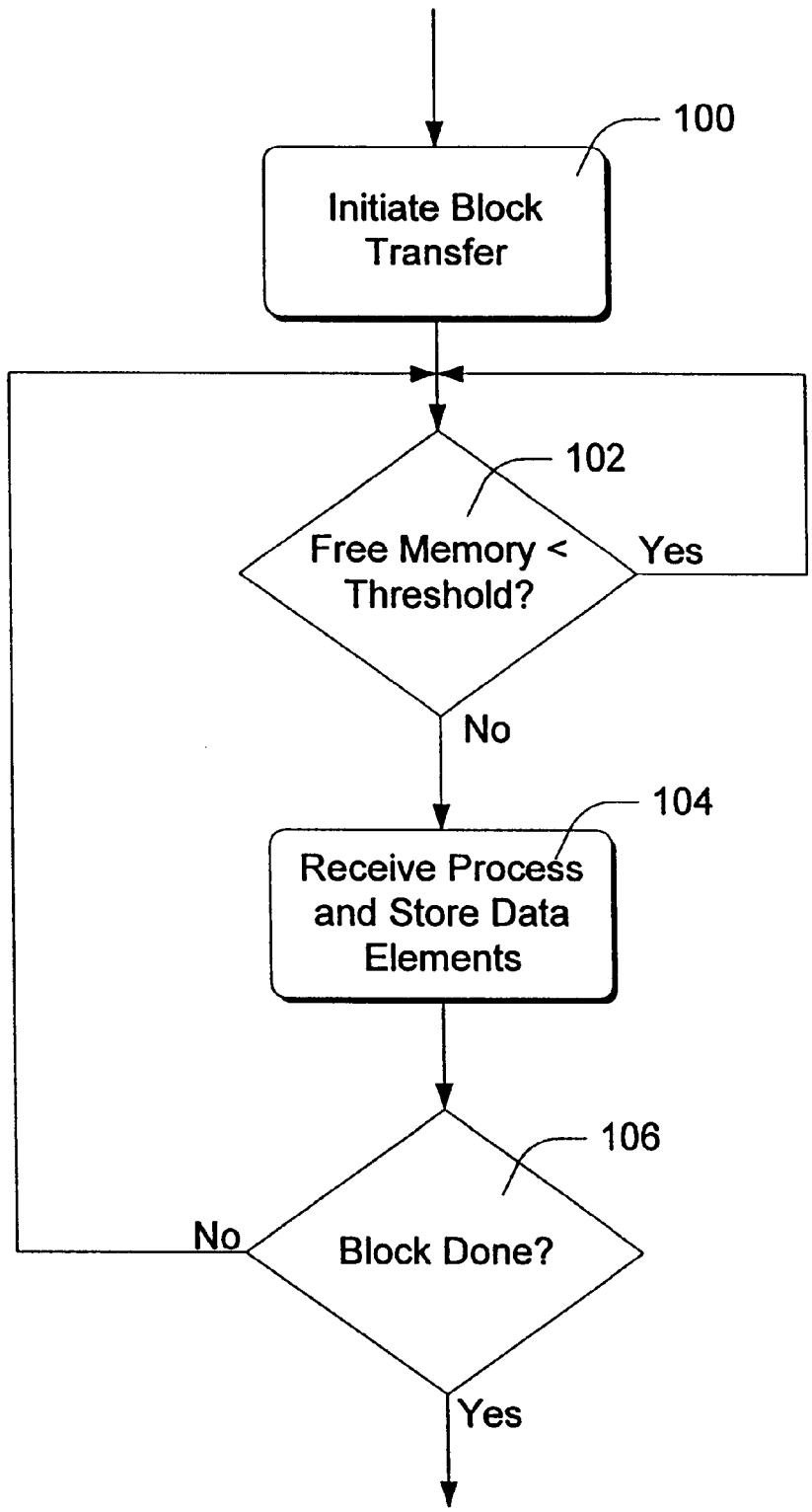
FIG. 3 is a flowchart illustrating preferred steps in accordance with the invention.

FIG. 3 illustrates a method, in accordance with the invention, for processing and buffering data blocks prior to storing them on the tape storage device. A step 100 comprises initiating a block transfer of an unprocessed data block from host computer 10. In most steps, the transfer is initiated by host computer 10. The unprocessed data block contains unprocessed data bytes, words, or elements that are transferred in sequence during the block transfer. The unprocessed data block has a size that is defined by the host computer.

A subsequent step 102 comprises determining the amount of free memory in buffer 46. That is, the interface logic determines how much buffer memory is available for storage of incoming data. In addition, this step includes comparing the amount of free buffer memory with a predetermined memory threshold. If the amount of free memory is less than the predetermined threshold, step 102 is repeated until the amount of free memory rises above the threshold. In practice, this represents a step of temporarily suspending the block transfer whenever the amount of free memory in the memory buffer falls below the threshold, and a subsequent step of resuming the block transfer whenever the amount of free memory in the memory buffer is not below the first predetermined threshold. Such suspension and resumption of a block transfer is accomplished using standard SCSI protocols.

The threshold is calculated to account for data elements that have been received from the host computer but that have not yet been stored in the memory buffer. Thus, the threshold prevents buffer overflow that might otherwise result from data that has been accepted from the host computer, but that is still "in-transit." In-transit data elements are data elements that are being processed but that have not been stored in buffer 46. It is generally possible to pre-calculate the maximum number of data elements that can be in-transit at any given time, for a given logic design. In the described embodiment of the invention, the memory threshold is set equal to or slightly greater than this maximum number.

Dual thresholds can advantageously be used to increase efficiency of data transfer. For example, a first threshold is used when determining whether to suspend a current block transfer, and a second, higher threshold is used when determining whether to resume the block transfer.

Whenever the comparison of step 102 indicates that the amount of free memory is not below the predetermined threshold, step 104 is performed of receiving and processing one or more data elements from the incoming data block to create processed data elements. Step 104 further includes storing the processed data elements in memory buffer 46.

When such processing is complete for a particular data block, the processed data elements form a processed data block in memory buffer 46 having a size that is different (usually smaller) than the size of the received unprocessed data block. Processing includes compression steps and other steps to ready the data for eventual writing to a tape medium. Thus, processing is often performed on a group of data elements, so that there is not a one-to-one correspondence between incoming data elements and the actual processed data elements written to the memory buffer. Thus, step 104 might involve receiving a number of unprocessed data elements before writing any processed data elements to the memory buffer 46.

Step 106 comprises checking whether all of the unprocessed data block has been received and processed. If it has not, execution reverts back to step 102 of checking available memory. Thus, step 102 is performed repeatedly while performing the processing and storing steps, to monitor the amount of available memory and to suspend a block transfer whenever available memory is low. If the result of step 106 is true, the process of receiving and buffering a data block is complete.

The interface logic also performs a step of writing or transferring processed data blocks to the tape storage mechanisms of the tape drive. This step is performed either while receiving the data block or after the data block has been completely buffered, depending on implementation details.

The described invention allows efficient use of tape drive buffer memory, without complex calculation and their associated hardware or software overhead.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

What is claimed is:

1. A method of processing and buffering data blocks prior to storing them on a tape storage medium, each data block containing unprocessed data elements that are transferred in sequence during a block transfer from a host computer, comprising the following steps:

initiating a block transfer of an unprocessed data block from a host computer, the data block having a first size;

processing the data block as it is received from the host computer to create processed data elements that form processed data block, the processed data block having a second size that is different from the first size;

storing the processed data elements in a memory buffer as they are created;

while performing the processing and storing steps, repeatedly determining an amount of free memory in the memory buffer;

temporarily suspending the block transfer whenever the amount of free memory in the memory buffer is below a first predetermined threshold;

writing the processed data block from the memory buffer to the tape storage medium.

2. A method as recited in claim 1, further comprising a step of calculating the predetermined threshold to account for data elements that have been received from the host computer but that have not yet been stored in the memory buffer.

3. A method as recited in claim 1, wherein a data element is defined as being in-transit when it has been received from the host computer but has not yet been stored in the memory buffer, and wherein there is a known maximum number of data elements that can be in-transit at any given time, the method further comprising a step of calculating the predetermined threshold to account for the maximum number of in-transit data elements.

4. A method as recited in claim 1, comprising a further step of resuming the block transfer whenever the amount of free memory in the memory buffer is not below the first predetermined threshold.

5. A method as recited in claim 1, wherein a data element is defined as being in-transit when it has been received from the host computer but has not yet been stored in the memory buffer, and wherein there is a known maximum number of data elements that can be in-transit at any given time, the method further comprising:

calculating the predetermined threshold to account for the maximum number of in-transit data elements;

resuming the block transfer whenever the amount of free memory in the memory buffer is not below the first predetermined threshold.

6. A method as recited in claim 1, comprising a further step of resuming the block transfer whenever the amount of free memory in the memory buffer is above a second predetermined threshold, the second predetermined threshold being greater than the first predetermined threshold.

7. A method as recited in claim 1, wherein the processing step comprises compressing the data block.

8. A tape storage device for use in conjunction with a host computer, the tape storage device comprising:

a tape writing mechanism;

interface logic between the host computer and the tape writing mechanism;

a memory buffer;

the interface logic being configured to perform steps comprising:

accepting a request for a block transfer of an unprocessed data block from a host computer, the unprocessed data block having a first size;

receiving the unprocessed data block from the host computer;

processing the unprocessed data block as it is received from the host computer to create processed data elements that form a processed data block, the processed data block having a second size that is different from the first size;

storing the processed data elements in the memory buffer as they are created;

while performing the processing and storing steps, repeatedly determining an amount of free memory in the memory buffer;

temporarily suspending the block transfer whenever the amount of free memory in the memory buffer is below a first predetermined threshold;

transferring the processed data block from the memory buffer to the tape writing mechanism.

9. A tape storage device as recited in claim 8, wherein the predetermined threshold is calculated to account for data elements that have been received from the host computer but that have not yet been stored in the memory buffer.

10. A tape storage device as recited in claim 8, wherein:

a data element is defined as being in-transit when it has been received from the host computer but has not yet been stored in the memory buffer;

there is a known maximum number of data elements that can be in-transit at any given time;

the predetermined threshold is calculated to account for the maximum number of in-transit data elements.

11. A tape storage device as recited in claim 8, wherein the interface logic is configured to perform a further step comprising resuming the block transfer whenever the amount of free memory in the memory buffer is not below the first predetermined threshold.

12. A tape storage device as recited in claim 8, wherein:

a data element is defined as being in-transit when it has been received from the host computer but has not yet been stored in the memory buffer;

there is a known maximum number of data elements that can be in-transit at any given time;

the predetermined threshold is calculated to account for the maximum number of in-transit data elements;

the interface logic is configured to perform a further step comprising resuming the block transfer whenever the amount of free memory in the memory buffer is not below the first predetermined threshold.

13. A tape storage device as recited in claim 8, wherein the interface logic is configured to perform a further step comprising resuming the block transfer whenever the amount of free memory in the memory buffer is above a second predetermined threshold, the second predetermined threshold being greater than the first predetermined threshold.

14. A tape storage device as recited in claim 8, wherein the processing step comprises compressing the data block.

15. A tape storage device as recited in claim 8, further comprising an SCSI interface that receives the unprocessed data block from the host computer.

* * * * *